United States Patent [19]

Braehler et al.

[11] Patent Number: 4,976,569
[45] Date of Patent: Dec. 11, 1990

[54] METHOD OF INTRODUCING ECOLOGICALLY HARMFUL WASTE INTO SUBTERRANEAN CAVITIES

[75] Inventors: Georg Braehler, Freigericht; Benno Ganser, Alzenau-Wasserlos; Paul-Gerhard Maurer, Neuberg, all of Fed. Rep. of Germany

[73] Assignee: NUKEM GmbH, Hanau, Fed. Rep. of Germany

[21] Appl. No.: 195,595

[22] Filed: May 18, 1988

[30] Foreign Application Priority Data

May 20, 1987 [DE] Fed. Rep. of Germany ....... 3716851

[51] Int. Cl.$^5$ ............................................. B09B 1/00
[52] U.S. Cl. ....................................... 405/59; 405/55; 405/53; 405/128
[58] Field of Search ....................... 405/59, 53, 54, 55, 405/56, 57, 58, 128

[56] References Cited

U.S. PATENT DOCUMENTS

| | | | |
|---|---|---|---|
| 3,438,203 | 4/1969 | Lamb et al. | 405/59 |
| 3,519,076 | 7/1970 | Walker | 405/59 X |
| 3,745,770 | 7/1973 | Fraser et al. | 405/59 |
| 3,887,462 | 6/1975 | Lagess et al. | 210/747 X |
| 4,577,999 | 3/1986 | Lindorfer et al. | 405/128 X |

Primary Examiner—Randolph A. Reese
Assistant Examiner—J. Russell McGee
Attorney, Agent, or Firm—Beveridge, DeGrandi & Weilacher

[57] ABSTRACT

Subterranean cavities which can be filled with water or brine are also used for safely depositing ecologically harmful waste. In order to introduce the waste, which must not come in contact with the water or brine, a liquid which is not miscible with water and is specifically heavier than water or brine is let in below the water or brine, where it forms a layer, and the waste is introduced into this liquid via a pipeline, whereby the waste or the mixtures of waste and binding agents must be specifically heavier than the liquid. The displaced water or brine is upwardly removed.

7 Claims, 1 Drawing Sheet

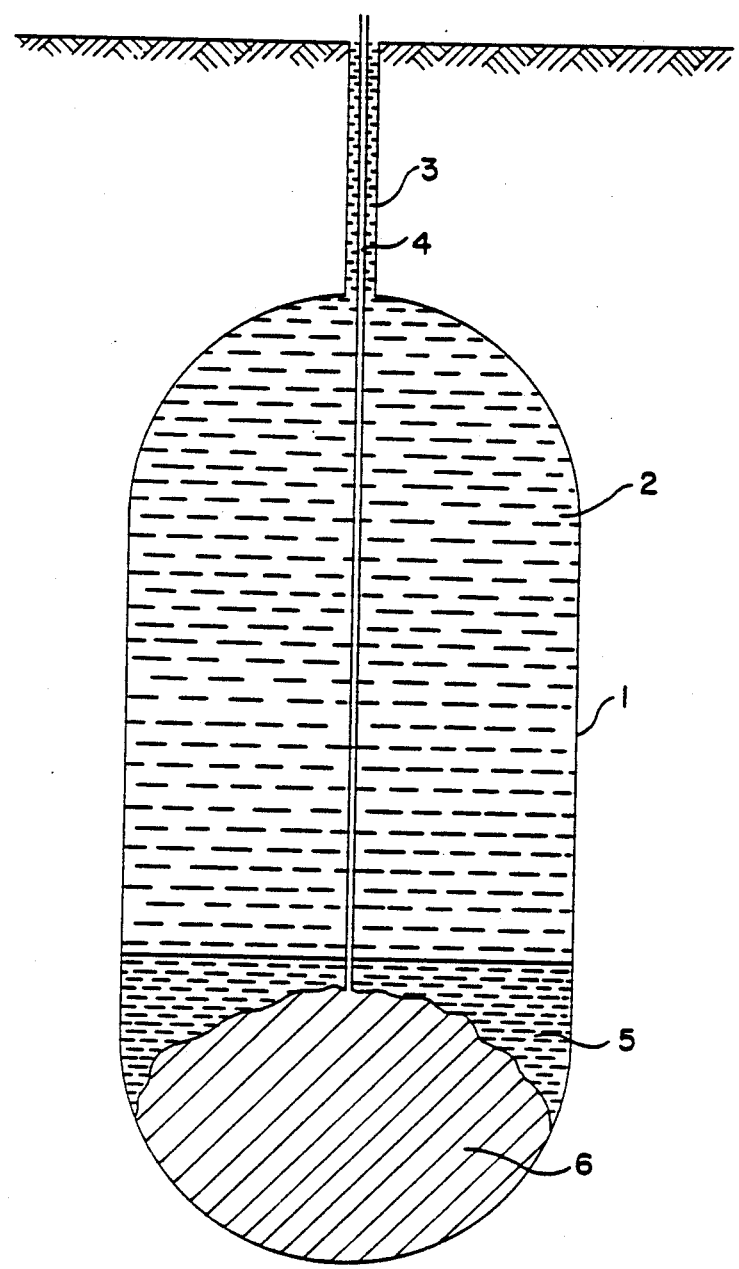

METHOD OF INTRODUCING ECOLOGICALLY HARMFUL WASTE INTO SUBTERRANEAN CAVITIES

INTRODUCTION AND BACKGROUND

The present invention relates to a method of introducing ecologically harmful solid or sludge-like waste as well as mixtures of solid, sludge-like or liquid waste with binding agents into subterranean cavities filled with water or brine.

The storage of ecologically harmful waste in above-ground depots is becoming increasingly more difficult and is also problematic. Reasons for this are the decreasing availability of depots suitable for this purpose, the occurrence of precipitations, the expensive protection for avoiding ground water contamination as well as the problems of long-term integrity both of the conditioned waste and also of the above-ground depots themselves.

An alternative is to introduce waste into subterranean chambers of suitable geological formations.

As shown in tests for the final disposal of radioactive waste in underground facilities such as salt domes, a sufficient long term safety can be expected. These underground chambers can be filled with solid waste or also with suitable sludges. Another possibility is to introduce solid, sludge-like or even liquid waste after mixing it with a suitable binding agent such as cement, fly ash from coal fired power plants or gypsum. A solidification of these mixtures can then take place underground. Subterranean cavities can be produced in salt domes either by mechanically removing the salt or by dissolving salt with water. Cavities of this type are used for storing items such as petroleum.

However, cavities filled with water or brine in salt formations or in other typical geological formations are not suitable for the introduction of water-soluble wastes or not-yet-hardened mixtures of waste and binding agent. The noxious substances that can be present in such waste can pass into the water or brine and must be removed again. It has been found that mixtures with binding agents cannot achieve the required mechanical properties under water.

SUMMARY OF THE INVENTION

An object of the present invention is to provide a method of introducing ecologically harmful solid or sludge-like waste as well as mixtures of solid, sludge-like or liquid waste with binding agents into subterranean cavities filled with water or brine in which method the material to be introduced is protected against the action of water or brine during the filling process without having to empty the cavity before the start of operations.

In attaining the above and other objects, a feature of the invention resides in selecting a liquid which is not miscible with and has a higher density than water or brine. This liquid is then introduced below the water or brine, where the selected liquid forms a layer. Then, the waste or the mixtures of waste and binding agents are introduced via a pipeline into the selected liquid which is not miscible with water or brine. In carrying out the invention, the density of the waste or of the mixtures of waste and binding agents must be greater than that of the liquid which is not miscible with water or brine and, as a result, the water displaced by the filling with waste or the displaced brine is upwardly removed.

Chlorofluorocarbons have proven to be especially suitable as liquids which are not miscible with water or brine.

BRIEF DESCRIPTION OF DRAWING

The drawing is a schematic diagram of a device for introducing ecologically harmful waste into a subterranean cavity.

DETAILED DESCRIPTION OF INVENTION

The method of the invention will now be explained in more detail with reference made to the schematic drawing.

A cavity (1) filled with brine (2), density $1.25 \text{ g/cm}^3$ is located in a suitable geological formation, e.g. in a salt dome. A liquid (5) with higher density which is not miscible with the brine (2) is introduced into the chamber through a borehole (3) and settles under the brine (2) to form a discrete layer. The amount of the liquid (5) is adapted both to the geometry of the hollow space and also to the geometry of the waste configuration to be introduced later in such a manner that a sufficient amount of the liquid (5) is assured between the waste configuration and the supernatant brine (2). Suitable liquids (5) are e.g. chlorinated hydrocarbons and fluorocarbons with an appropriate density on account of their advantageous properties.

It is especially advantageous if chlorofluorocarbons with densities of approximately $1.3-1.6 \text{ g/cm}^3$ are used as the liquid which is not miscible with water or brine and function as a blocking medium since they can be readily obtained on account of their broad industrial application.

After the underlayer of selected liquid (5) has been created, a mixture (6) of biohazardous waste and binding agents, e.g. with a density higher than $2 \text{ g/cm}^3$, is filled into the chamber (1) via a pipeline (4) which runs in a movable fashion through the borehole (3) and whose lower end is immersed in the liquid (5). As the waste (6) is introduced into the cavity it will gradually displace the quantity of brine (2) present in the cavity. The brine (2) which is displaced thereby is removed, e.g. pumped off, upward through the borehole (3). The pipeline (4) is drawn upward in correspondence with the level of the liquid (5), which rises as a consequence of the introduction of waste, so that its lower end is always submerged in the blocking liquid (5) as the filling with waste progresses. The pipeline (4) can be guided by conventional measuring devices.

The slight heat produced in the case of solidification with binding agents is removed via the brine (2) or the water or the waste already stored and the surrounding geological formation in such a manner that the vapor pressure of the blocking liquid (5) can not rise in a disadvantageous manner.

After the chamber (1) has been filled, the residual liquid is pumped off and the borehole sealed.

Further variations and modifications will be apparent to those skilled in the art and are intended to be encompassed by the claims appended hereto.

We claim:

1. A method of storing ecologically harmful waste in a subterranean cavity having an opening to the surface and being filled with water or brine, comprising selecting a liquid which is not miscible with and is specifically heavier than water or brine, introducing said liquid into said cavity below the water or brine, to thereby form a layer of said liquid below a layer of water or brine, inserting conduit means into said opening and lowering said conduit means until the lower end of said conduit means is into the layer of said liquid and then introducing said waste into said liquid which is not miscible with water or brine, wherein the density of the waste is higher than that of the said liquid and removing the water or brine displaced by the waste introduced from said opening.

2. The method according to claim 1, wherein a chlorofluorocarbon or mixture thereof is used as said liquid which is not miscible with water or brine.

3. The method of claim 1, wherein said waste is solid waste.

4. The method of claim 3, wherein said waste is a mixture containing a binding agent.

5. The method of claim 1, wherein the opening to the surface is sealed after removing the water or brine displaced by the waste.

6. The method of claim 1, wherein said liquid is a chlorinated or fluorinated hydrocarbon.

7. The method of claim 1, wherein said liquid has a density of about 1.3 to 1.6 g/cm$^3$.

* * * * *